March 22, 1966

F. SIROLA 3,241,404

BORING TOOL

Filed June 9, 1964

INVENTOR
FRANK SIROLA
BY
ATTORNEYS

March 22, 1966  F. SIROLA  3,241,404
BORING TOOL
Filed June 9, 1964  2 Sheets-Sheet 2
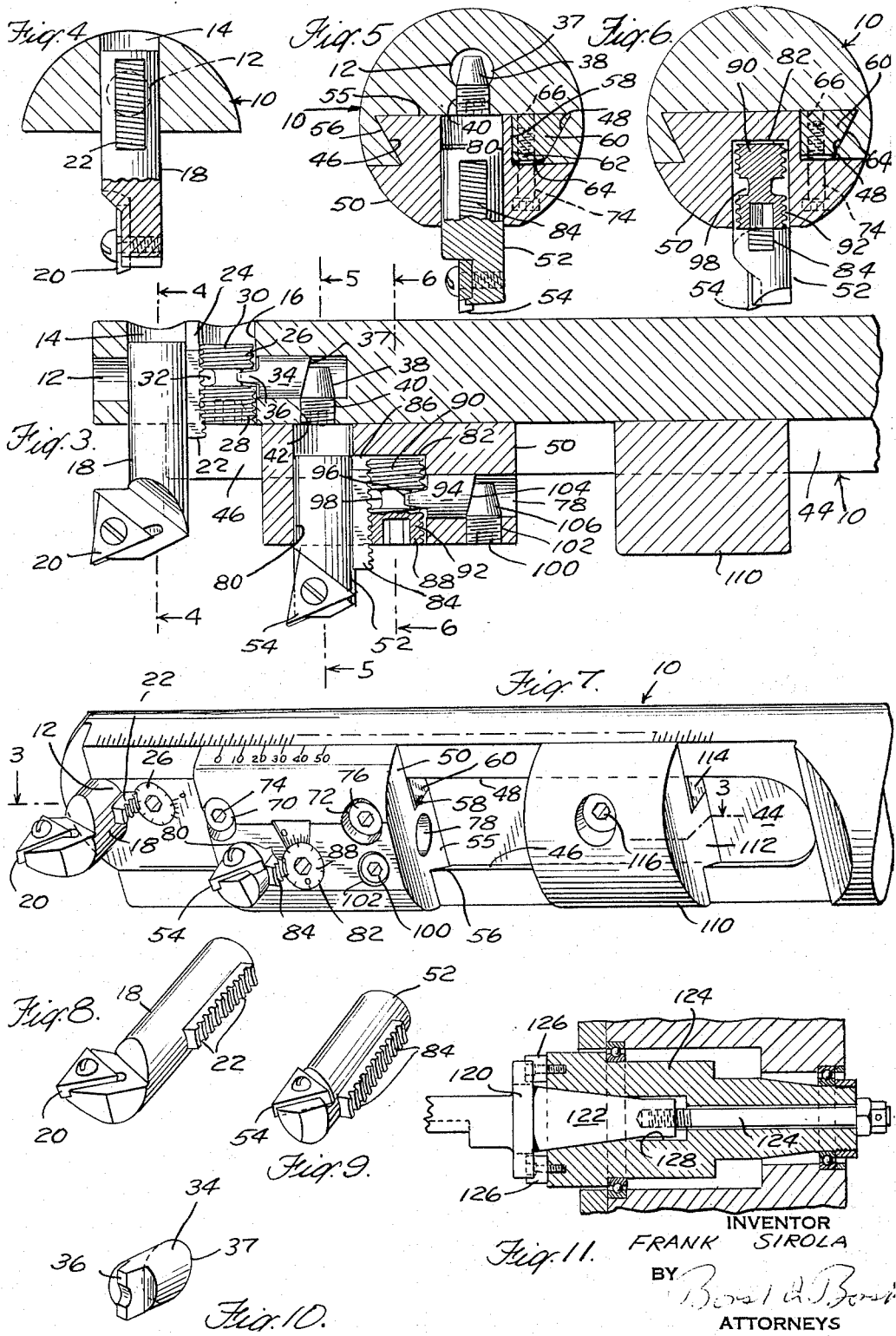
INVENTOR
FRANK SIROLA
BY
ATTORNEYS

United States Patent Office 3,241,404
Patented Mar. 22, 1966

3,241,404
BORING TOOL
Frank Sirola, % Aloris Tool Co., Inc., 419 Getty Ave., Clifton, N.J.
Filed June 9, 1964, Ser. No. 373,804
6 Claims. (Cl. 77—58)

This invention relates to an accessory for a lathe or the like and, in particular to a boring tool, which provides a pair of adjustably spaced cutters for forming counter bores in a work piece.

In general the boring tool comprises a boring bar construction which provides a pair of cutter holders each designed for micrometer adjustment inwardly and outwardly of the bar. Means are also provided for adjustably spacing the holders longitudinally of each other. The micrometer adjustment of the holders is achieved by rack and screw elements with each of the screw elements being specially designed so as to serve an additional function in conjunction with a cam member for securely locking in position its associated cutter holder. Accuracy of the bore cutting during lathe operation is thus assured. As a consequence, provision is made for mounting the holders on the bar for relative longitudinal movement while maintaining both cutters in true cutting position.

Additional means are provided on the bar for engagement with the holder of the tool post of a lathe which means is translatable and is movable relative to the work and assures additional security during the cutting operation and hence accuracy thereof.

One object of the invention is to provide a lathe cutter construction for accurately forming counter bores in a work piece.

Another object of the invention is to provide an improved locking expedient for cutter holders on a lathe or like device.

Other objects and advantages of the invention may be appreciated on reading the following detailed description of one of its embodiments which is taken in conjunction with the accompanying drawings, in which:

FIGURE 3 is a longitudinal sectional view of a portion of the boring tool on an enlarged scale showing the locking and adjusting elements for the cutters.

FIGURE 4 is a transverse cross-section on line 4—4 of FIGURE 3.

FIGURE 5 is a transverse cross-section on line 5—5 of FIGURE 3.

FIGURE 6 is a similar cross-section on line 6—6 of FIGURE 3.

FIGURE 7 is a perspective view of the cutting tool with the right hand end broken away.

FIGURES 8 and 9 are respective cutters per se shown in FIGURE 3.

FIGURE 10 is a perspective detail of one of the locking wedges.

FIGURE 11 is a portion of a modified boring tool partly in section for use in a milling machine and provided with tapered shank.

Figure 1:
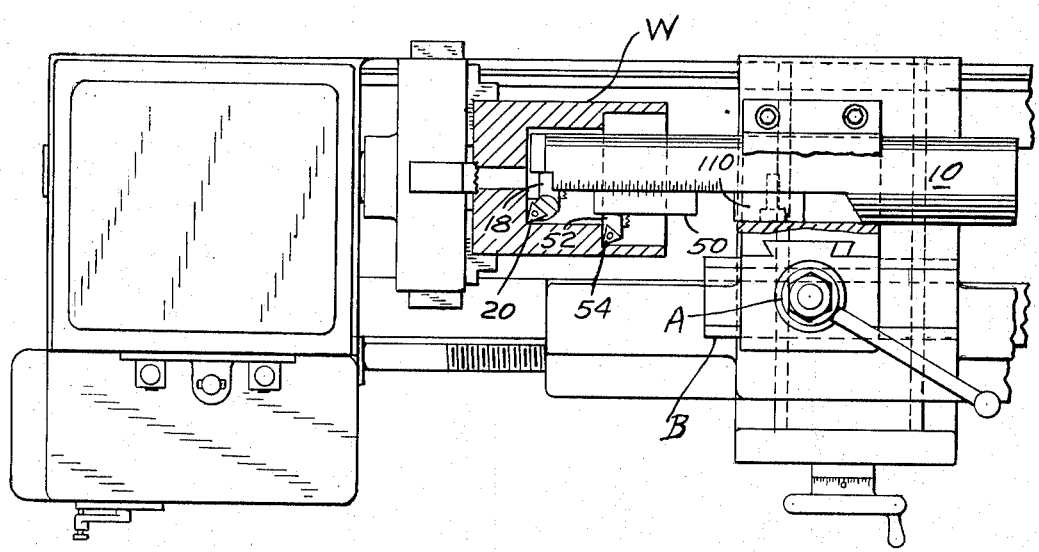
FIGURE 1 is a plan view of a lathe with the tail stock omitted and the work piece in axial cross-section and counter bore completed by the boring tool embodying the invention.
Figure 2:
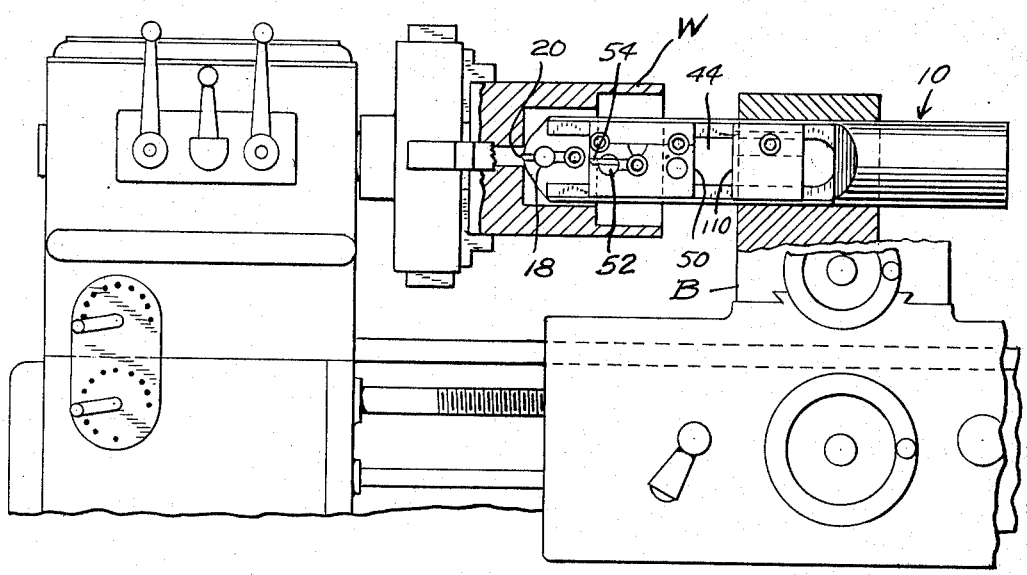
FIGURE 2 is a front view of the lathe with the work piece in axial cross-section and the boring tool as shown in FIGURE 1.

Referring to the drawings, there is provided a boring bar 10 which is adapted in one form to be retained in a holder of a tool post A mounted on the carriage B of an engine lathe, turret lathe or boring mill as shown in FIGURES 1 and 2 of the drawings and in a slightly modified form to be retained in the rotating member of a milling machine. One end of the bar is provided with a longitudinal bore 12. A pair of side openings 14 and 16 are formed in one face of the bar communicating with the bore 12 and with each other. A cutter holder 18 is provided in the opening 14, supporting at one end a triangular shaped carbide cutting element 20 which can be turned to bring into operative position any one of three cutting edges. The holder is provided with a lateral rack 22 which extends into the opening 16 through a communicating channel 24.

Disposed in the opening 16 for free turning movement is holder adjusting screw 26 in threaded engagement with the rack 22 attached to the holder 18. The screw 26 has a pair of spaced threaded portions 28 and 30 separated by peripheral groove 32. Disposed in the longitudinal bore 12 is a locking member 34 one end of which has a projection 36 seated in the groove 32, the other end having a cam surface 37 engaged by an opposing cam surface 38 on set screw 40 which is disposed in a threaded opening 42 in the face of the bar.

It is apparent that the positioning of the holder 18 is accomplished by loosening the set screw 40 and swivelly turning the adjusting screw 26 by means of a tool designed for the purpose. As a consequence of the screw engagement between the rack 22 on the holder and the threaded portions of the screw 26, which is maintained in axial position by virtue of its peripheral groove contact with the projection 36 extending from the end of the locking member 34, the holder is moved in the opening 14 so as to position the cutting element 20 toward and away from the bar 10 as desired, and in cutting engagement with the work W.

The bar 10 is provided with a slot 44 having dovetail sides 46 and 48. A slide 50 designed to retain a second carbide cutter holder 52 and having a cutter element 54 similar to cutter 20 is provided with a depending portion 55 within the slot 44 the portion 55 having an inclined edge 56 complementary to the dovetail side 46 of the slot 44 and an opposing edge 58 normal to the surface of the slot. Extending the length of the slide and disposed between the edge 58 and the dovetail side 48 of the slot is gib 60 which has a side surface 62 complementary to the edge 58 of the member 55 and an inclined edge 64 complementary to the dovetail side 48 of the slot. The gib has a pair of threaded holes 66 opposed by openings 70 and 72, respectively, in the slide, there being provided set screws 74 and 76 in the opposing openings and threaded holes for locking the slide in its desired longitudinal position relative to the cutter holder 18 disposed in the bar using the vernier scale on the slide and opposing graduations on the bar 10 for accurate setting.

The slide 50 is formed with a longitudinally extending bore 78 similar to the bore 12 and which opens through one end thereof and communicates with side openings 80 and 82. The cutter holder 52 is slidable in the opening 80 for relative adjustment of the cutter element 54 and for such purpose the holder is provided with a lateral rack 84 extending through a channel 86 in communication with the side opening 82. An adjusting screw 88 similar to the adjusting screw 26 is arranged in the side opening 82 for free turning movement with the threaded portions 90 and 92 thereof in engagement with the rack 84. A locking member 94 similar to the locking member 34 is longitudinally slidable in the bore 78 with the projection 96 thereof sealed in the groove 98 between the threaded portions 90 and 92 of the adjusting screw 88. The locking member 94 is returned in operative position by means of a set screw 100 similar to the set screw 40 so as to limit the adjusting screw 88 to swivel turning movement and when the set screw 100 is tightened in the threaded opening 102 in the silde the adjusting screw 88 is locked against movement so as to retain the cutter holder 52 in set position. It is to be understood that the locking member 94 is formed with a cam face 104 which is arranged in engagement with the conical shaped inner end 106 of the set screw 100 for camming the locking member 94 against the adjusting screw 88.

Longitudinally slidable in the slot 44 is a reinforcing member 110 which is adapted to be engaged directly in the tool holder of the tool post mounted on the carriage of a lathe. Thus the reinforcing member may be positioned close to the slide 50 so as to securely hold the end of the bar 10 in the tool holder against sidewise deflection with the biting of the cutters into the work. The reinforcing member 110 is formed with a depending portion 112 having a gib 114 which portion and gib fittingly engage the slot 44. A set screw 116 extending through an opening in the reinforcing member into threaded engagement with a threaded opening in the gib serves to lock the reinforcing member in desired set position.

When the cutter tool is used in conjunction with a milling machine as shown in FIG. 11 it is provided with a notched flange 120 and a tapered section 122 at its driving end. The rotating drive member 124 of the machine is provided with notch engaging lugs 126 and an internal section 128 in its hollow bore which receives the section 122 of the tool. The latter is pulled into operative drive position by means of a screw 124 threadedly engaging a threaded hole in the tool.

Various modifications of the tool bar construction and its attachment to various types of boring or milling machines may be effected by persons skilled in the art without departing from the scope and principle of the inventiton as defined in the appended claims, in which:

1. In a boring bar construction, an elongated bar, a cutter holder mounted on said bar, a slide mounted on said bar for movement longitudinally thereof, a second cutter holder mounted on said slide for movement with said slide for varying the spacing thereof from said first mentioned holder, said slide having a bore extending longitudinally thereof and having an opening in which said second holder is mounted, said second holder having a threaded portion, said slide having a second opening in communication with said first mentioned opening and in communication with said bore, an adjusting screw mounted in said second opening and threadedly engaging the threaded portion of said second holder, a locking member arranged in said bore and disposed in engagement with said adjusting screw for limiting said adjusting screw to swivel turning movement for movement of said second holder inwardly and outwardly on said slide, a tightening member carried by said slide and engaging said adjusting screw for retaining the screw against said swivel movement and for securing said second holder in set position on said slide, and means carried by said slide and bar for securing said slide in set position on said bar.

2. In a boring bar construction, an elongated bar, a cutter holder mounted on said bar and having a threaded portion, said bar having a bore and side opening, said cutter holder being disposed in said side opening, said bar having a second opening, an adjusting screw arranged in said second opening and engaging said threaded portion, a locking member arranged in said bore in impinging and normal relation with and to said adjusting screw, and a tightening member retained in said bar for causing said locking member to be placed in screw lock position.

3. In a boring bar construction, an elongated bar, a cutter holder mounted on said bar and having a threaded portion, said bar having a bore and a side opening, said cutter holder being disposed in said side opening, said bar having a second opening, an adjusting screw arranged in said second opening and engaging said threaded portion, a locking member arranged in said bore in impinging relation with said adjusting screw, and a tool post engaging member slidably retained on said bar whereby the bar is securely held in the post at a selectively variable distance from said holder.

4. In a boring bar construction, an elongated bar having a longitudinally extending dovetail slot opening through one end thereof, a slide fitting said slot for sliding movement longitudinally of said slot, said slide having a bore opening through one end thereof and a plurality of side openings, a cutting tool holder engaging in one of said openings for sliding movement to dispose the outer end of said holder in varying relation from the bar, said tool holder having a threaded portion, an adjusting screw engaging in another of said side openings in said slide and arranged in threaded engagement with said threaded portion of said tool holder, said screw having a peripheral groove, a locking member arranged in said bore and having a rib at one end and a cam face at the other end, said rib engaging the peripheral groove of said screw to limit said screw to swivel turning movement for movement of said tool holder to vary the outer end thereof from said bar, a set screw threadedly engaging another of said side openings in slide and having a tapered inner end arranged in engagement with said cam face for retaining saih locking member in operative engagement with said adjusting screw and for tightening said locking member against said adjusting screw to prevent relative movement thereof for locking said tool holder in set position on the bar, said slide having a gib extending into one of the dovetail portions of said slot, and a screw threadedly engaging said gib through an opening in said slide for clamping said gib against said bar for locking the slide in set position on said bar.

5. In a boring bar construction, an elongated bar having a side opening adjacent one end, a first cutter member, a holder on which said cutter member is mounted, said holder being adjustably mounted in said opening for varying the outward position of said first cutter member, a slide mounted on said bar for longitudinal sliding movement thereon and having a side opening, a second cutter member, a second holder on which said second cutter member is mounted, said second holder being adjustably mounted in said side opening of said slide for varying the outward position of said second cutter member, and means carried by said bar and slide for securing said slide in set position on said bar in desired spaced relation from said first cutter member.

6. In a boring bar construction as set forth in claim 5, a reinforcing member mounted on said bar for movement toward and away from said slide, means carried by said bar and reinforcing member for securing said reinforcing member in fixed position on said bar, and said reinforcing member being adapted to be slidably positioned adjacent said slide and held by the tool holder of the lathe mounting the work to be cut by said cutter members so as to prevent sidewise deflection of said bar with the biting of the cutter members into the work.

No reference cited.

WILLIAM W. DYER, Jr., *Primary Examiner.*